United States Patent [19]

Ohkoda et al.

[11] Patent Number: 5,055,756
[45] Date of Patent: Oct. 8, 1991

[54] TRAVERSE APPARATUS AND IMAGE RECORDING APPARATUS

[75] Inventors: Keiji Ohkoda; Hitoshi Inoue, both of Yokohama, Japan

[73] Assignee: Canon Kabushiki Kaisha, Tokyo, Japan

[21] Appl. No.: 392,414

[22] Filed: Aug. 11, 1989

[30] Foreign Application Priority Data

Aug. 25, 1988 [JP] Japan ................................. 63-211508
Aug. 25, 1988 [JP] Japan ................................. 63-211509

[51] Int. Cl.$^5$ .............................................. G05B 6/02
[52] U.S. Cl. .................................... 318/618; 318/615; 388/809
[58] Field of Search ........................ 318/6, 7, 615, 616, 318/617, 618; 355/233, 235, 309, 321; 346/33 ME, 33 D, 139 A, 139 B, 141; 358/412, 494, 496, 497; 242/75.5, 75.51, 75.52; 388/800, 809, 816

[56] References Cited

U.S. PATENT DOCUMENTS

| | | | |
|---|---|---|---|
| 3,908,641 | 9/1975 | Judson et al. | 364/33 ME |
| 3,975,761 | 8/1976 | Taudt et al. | 358/412 X |
| 4,125,881 | 11/1978 | Eige et al. | 318/7 X |
| 4,232,371 | 11/1980 | Kamoto | 242/75.51 X |
| 4,323,832 | 4/1982 | Okamura | 242/75.51 X |
| 4,331,159 | 5/1982 | Bax et al. | 346/33 ME X |
| 4,335,336 | 6/1982 | Filippini | 242/75.5 X |
| 4,519,039 | 5/1985 | Surana et al. | 318/7 X |
| 4,523,234 | 6/1985 | Sangu | 358/496 |
| 4,525,654 | 6/1985 | Tajima et al. | 318/7 |
| 4,600,866 | 7/1986 | Seto | 388/809 |

Primary Examiner—Bentsu Ro
Attorney, Agent, or Firm—Fitzpatrick, Cella, Harper & Scinto

[57] ABSTRACT

Disclosed are a traverse apparatus and an image recording apparatus including a rotary member for traversing a material to be traversed, a storage unit for prestoring rotation control data based on diameter data corresponding to a rotation angle of the rotary member from a reference position in its circumferential direction, a detection unit for detecting the rotation angle of the rotary member, and a control unit for controlling an angular velocity of the rotary member on the basis of an output from the detection unit and a content of the storage unit so as to make a traverse velocity of the material to be traversed constant.

14 Claims, 8 Drawing Sheets

TRAVERSE APPARATUS AND IMAGE RECORDING APPARATUS

BACKGROUND OF THE INVENTION

1. Field of the Invention

The present invention relates to a traverse apparatus for traversing, e.g., a sheet- or plate-like member to be traversed by rotating a rotary member such as a roller and an image recording apparatus for forming an image on a traversed member.

2. Prior Art

FIG. 9 shows a prior art image recording apparatus for optically recording characters or images on a recording sheet such as a photosensitive film. In FIG. 9, a stack of nonused recording sheets 31 are stored in a supply magazine 32. The uppermost sheet is picked up by a separation mechanism (not shown) from an opening portion 33 formed in the supply magazine 32, and is placed on a guide plate 27. The sheet placed on the guide plate 27 is traversed by a traverse means (not shown) to a position where it is sandwiched between a driving roller 12 and a driven roller 21. The driving roller 12 is directly coupled to a motor 11 and an encoder 13.

A lower portion of FIG. 9 shows a block diagram of a motor control circuit. A DC amplifier 52 is used for amplifying an error, and receives an output voltage from a constant voltage source used for setting a motor speed. A motor driving circuit 53 controls the DC motor 11. A pulse signal corresponding to a rotation signal output from the encoder 13 for detecting a rotation speed is input to a pulse-voltage converter 55. The converter 55 converts the pulse signal output from the encoder 13 into a voltage, and feeds it back to the DC amplifier 52. As can be seen from these circuit configurations, the output from the encoder 13 is compared with a setting value voltage to perform feedback control, so that the motor 11 is controlled to a given rotation speed, thus performing a sub scanning operation of the sheet.

A guide plate 28 holds a sheet 23 passing the gap between the guide rollers 12 and 21. A recording laser beam 22 emerges from an optical unit (not shown), and performs main scanning in a direction A in FIG. 9. A light-emitting element 24 and a light-receiving element 25 are used for detecting the leading end of a sheet. A hole is formed in the guide plate 28 at a position immediately below a mirror 26. In a sheet absent state, light emitted from the light-emitting element 24 is reflected by the mirror 26, and then reaches the light-receiving element 25. By utilizing this detection device, a write start timing by the laser beam is obtained A recorded sheet is traversed inside a receiving magazine 35 from an opening portion 36 by a storage mechanism (not shown). Recorded sheets 34 are stacked and stored in the receiving magazine.

When the apparatus shown in FIG. 9 is used for recording a very fine image such as a medical image, constancy of a sub scanning velocity v of a sheet is very important, and a wow/flutter must be suppressed to about 0.2% or less.

In the prior art shown in FIG. 9, the velocity v of a sheet is not directly measured That is, a pulse count of the encoder obtained by converting rotation of the motor shaft is detected to calculate the velocity v. The velocity v is given by:

$$v = r\omega = r \cdot 2\pi n/N$$

where v is the velocity of a sheet, $\omega$ is the angular velocity of the motor, r is the radius of the roller 12, n is the pulse count of the encoder per unit time, and N is the pulse count per 360° of the encoder.

In the control circuit shown in FIG. 9, as shown in FIG. 10, control is made to achieve $\omega$=constant. Meanwhile, when the rotation center of the roller 12 does not coincide with the center of the section of the roller 12, i.e., when the roller is eccentrically mounted with respect to the rotation center, the radius r gradually changes during one revolution of the roller. Therefore, even if $\omega$=constant, the traverse velocity v of the sheet periodically changes, as shown in FIG. 11. For example, assuming that a roller having a diameter of 10 mm suffers from an eccentricity of 0.01 mm, even if the section of the roller is a circle, the eccentricity causes a wow/flutter of 0.4%. Thus, it is difficult to cause a total wow/flutter including other velocity variation factors to fall within a target value. If the roller diameter is increased while the eccentricity remains the same, the influence of the eccentricity is reduced. However, it is disadvantageous for realizing a compact apparatus, and a motor speed must be decreased, resulting in difficult control. In this manner, in the prior art, the influence of the eccentricity of the roller cannot be eliminated in the sheet velocity control.

SUMMARY OF THE INVENTION

It is an object of the present invention to provide a traverse apparatus and an image recording apparatus capable of traversing a material to be traversed at a constant velocity with high precision by controlling a rotation speed of a motor on the basis of correction data.

It is another object of the present invention to keep a traverse velocity constant in a traverse apparatus or an image recording apparatus even if a rotary member for traversing a material to be traversed suffers from a mounting eccentricity.

It is still another object of the present invention to keep a traverse velocity constant in a traverse apparatus or an image recording apparatus even if the section of a rotary member for traversing a material to be traversed is not circular.

It is still another object of the present invention to provide a traverse apparatus and an image recording apparatus capable of traversing a material to be traversed with high precision using an ultrasonic motor.

DESCRIPTION OF THE PREFERRED EMBODIMENTS

First Embodiment

Figure 1:
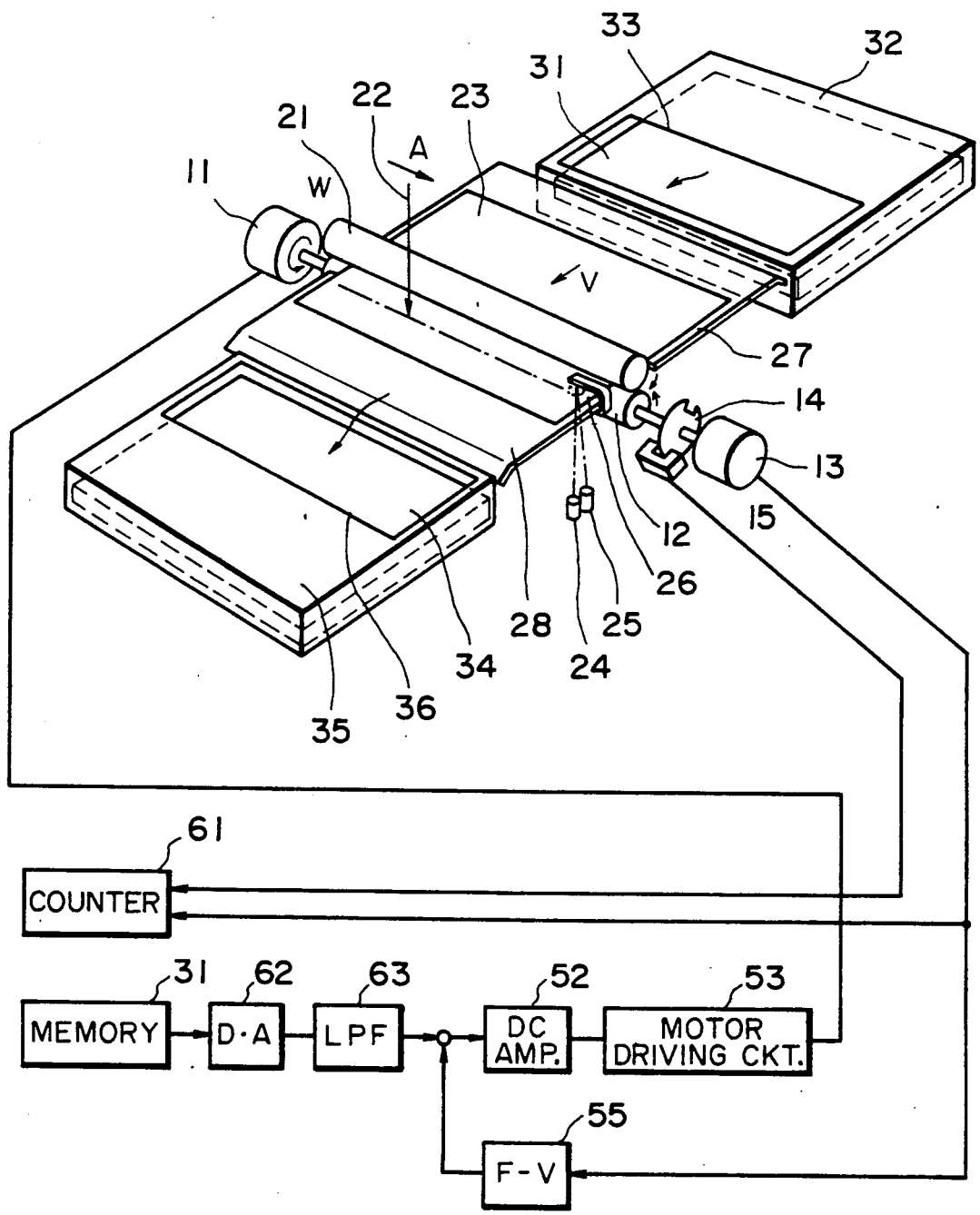
FIG. 1 is a schematic view of a traverse mechanism according to a first embodiment of the present invention.
Figure 2:
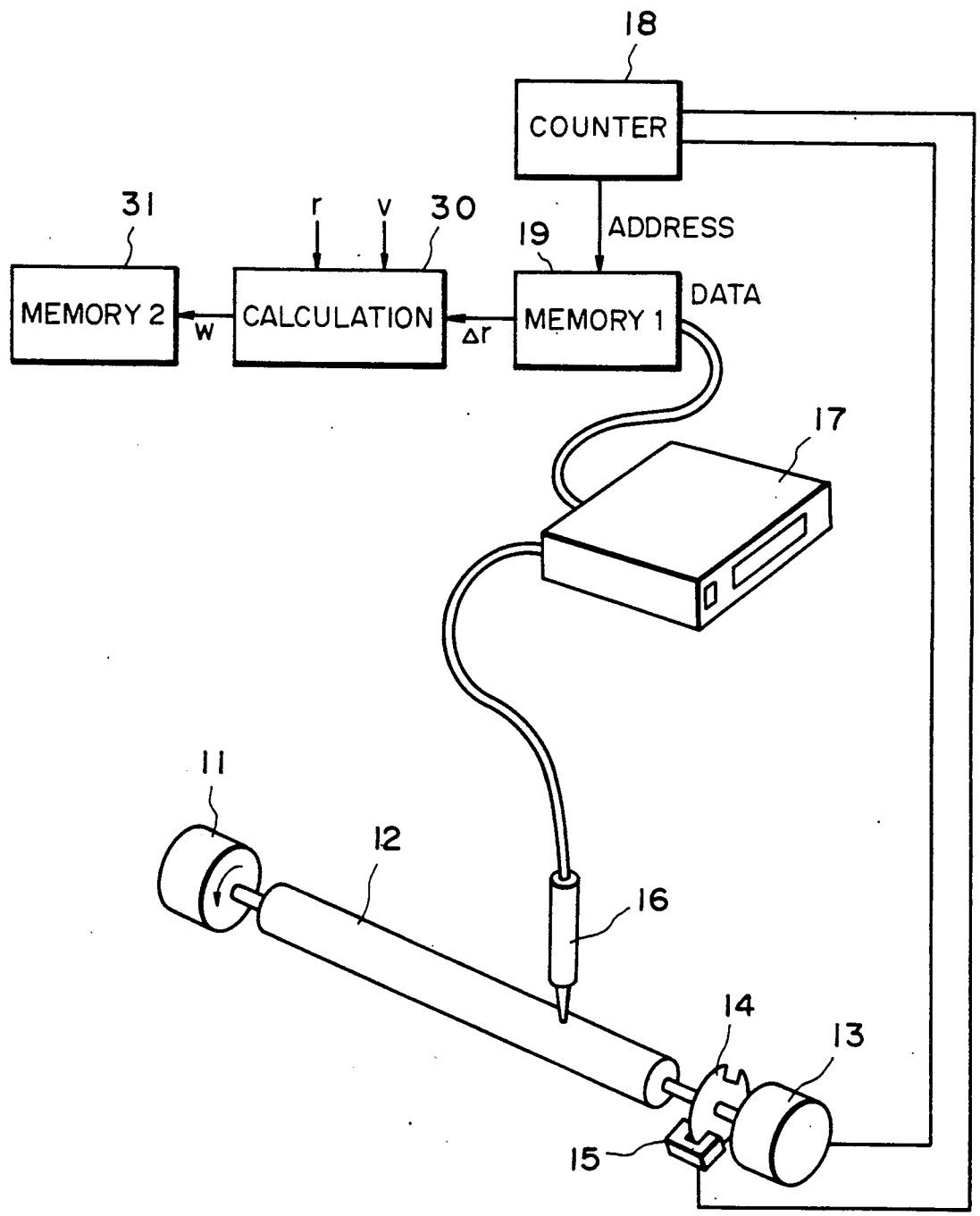
FIG. 2 is a view for explaining a mechanism for measuring a variation in diameter of a roller in the first embodiment.
Figure 9:
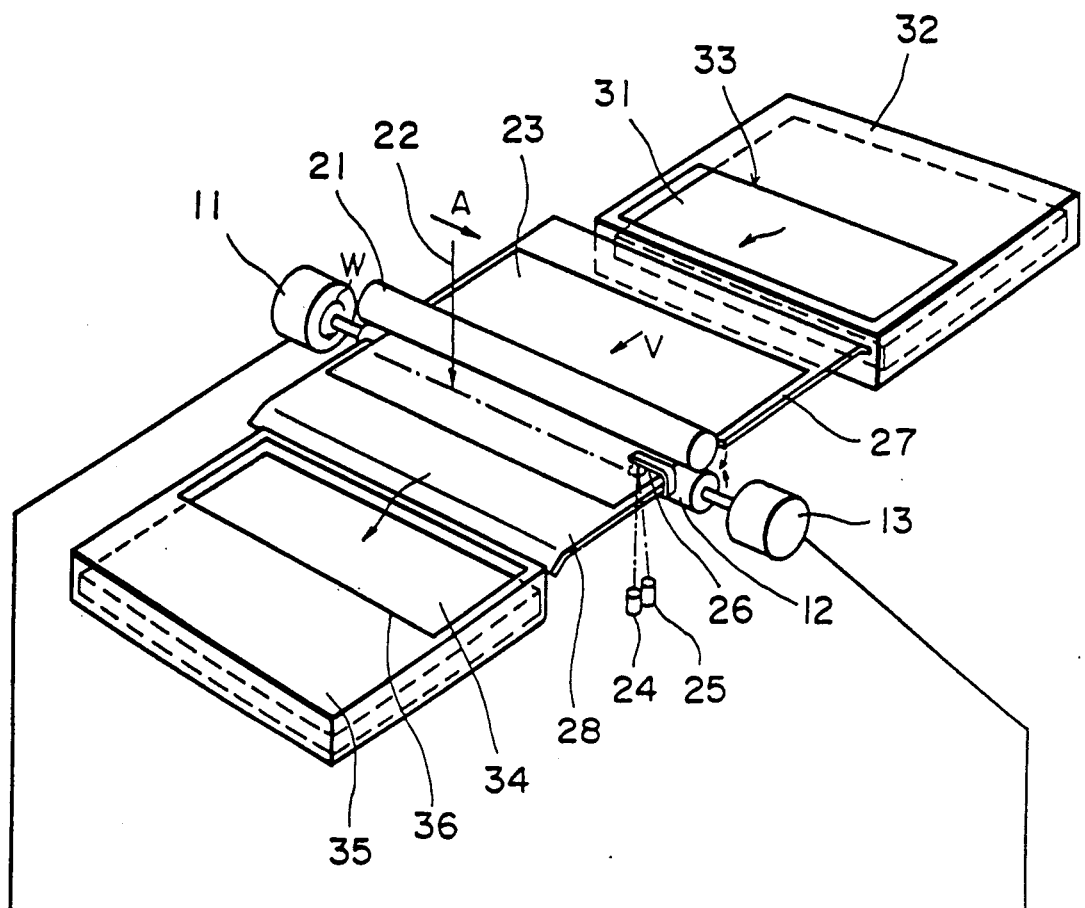
FIG. 9 is a schematic view of the prior art.
Figure 9:
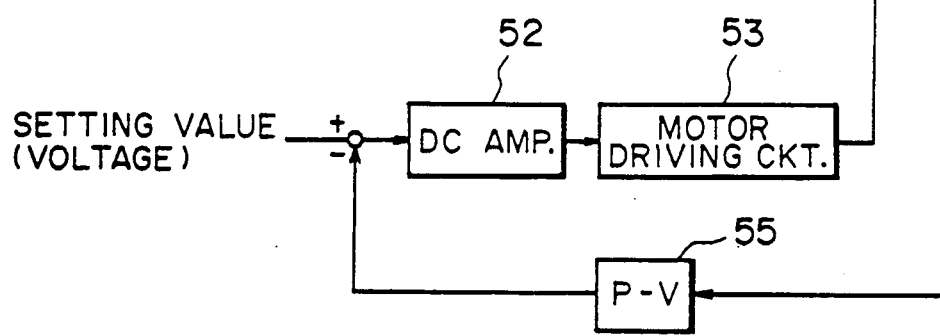
Figure 10:
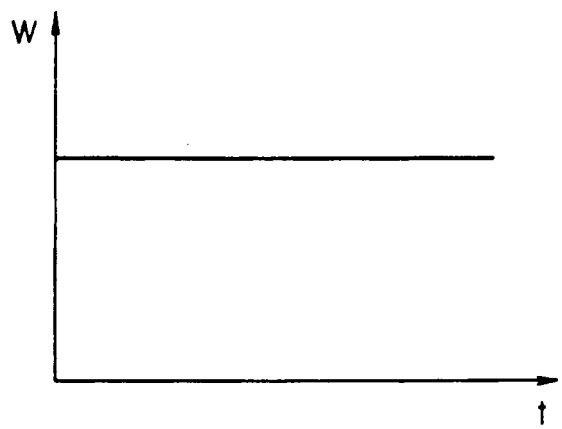
FIG. 10 is a graph showing an angular velocity of a roller as a function of time in the prior art.
Figure 11:
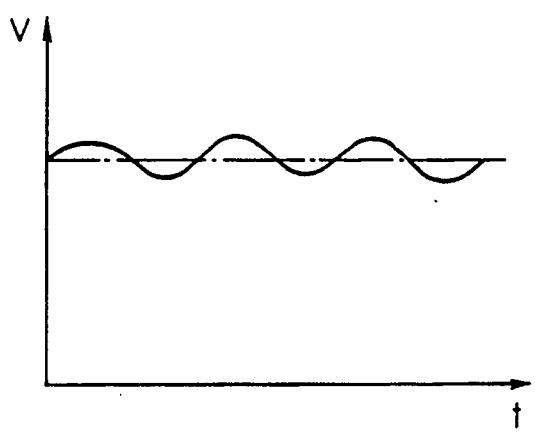
FIG. 11 is a graph showing a traverse velocity as a function of time in the prior art.

A first embodiment in which the present invention is applied to a medical image recording apparatus will be described below. FIG. 1 is a schematic view of a traverse mechanism of the first embodiment, and the same reference numerals in FIG. 1 denote the same parts as in FIG. 9. FIG. 2 is a view for explaining a mechanism for measuring a variation in diameter of a roller in the first embodiment. Note that the mechanism shown in FIG. 2 may be assembled in the image recording apparatus. Alternatively, the mechanism may be arranged to be separate from the image recording apparatus main body, and may be utilized upon assembly and adjustment of the image recording apparatus.

In FIG. 2, a traverse roller 12 having a radius r is directly connected to a driving motor 11. In this case, it is difficult to cause the rotation center of the motor 11 to perfectly coincide with the center of the roller 12, and a small offset is formed. This offset, i.e., a mounting error, is represented by $\Delta r$. The roller 12 makes an eccentric movement due to the error $\Delta r$. Note that the roller 12 which has a high degree of roundness and sufficiently higher precision of the roller radius r than $\Delta r$ is used. An encoder 13 detects rotation of the roller 12, and outputs a pulse signal according to the detected rotation. A slit 14 is fit on the rotating shaft of the roller to detect a reference position of the rotation of the roller. A photo interrupter 15 detects passage of the slit. A relative position detector 16 is brought into contact with the outer surface of the roller 12 to measure a degree of eccentricity of the roller, and has a precision of 1 $\mu$m. A detection device 17 detects a detection value of the relative position detector 16 as digital data. A counter 18 generates a memory address used when position detection data is stored in a memory. The counter 18 performs a count-up operation in response to the output pulse signal from the encoder 13, and is cleared in response to the output from the photo interrupter 15. A memory 19 stores position detection data in correspondence with a rotation angle from the reference position of the roller. A calculation unit 30 converts the content of the memory 19 into data used for motor rotation speed control. A memory 31 stores the conversion result of the calculation unit 30. Traverse control is performed in practice on the basis of data stored in the memory 31.

A sequence for obtaining data to be stored in the memory 31 will be described below.

The motor 11 is rotated. After the photo interrupter 15 detects the rotational reference position, position detection data per revolution of the roller from the detection unit 17 are sequentially stored in the memory 19 by utilizing the counter 18. This value does not represent an absolute distance l from the actual rotation center but represents only a relative displacement caused by the mounting eccentricity of the roller and cannot be directly used for rotation control. The distance l from the rotation center is expressed by the following equation $$l = \sqrt{r^2 + \Delta r^2 \cdot \sin^2\theta} + \Delta r \cdot \cos\theta$$

where r is the radius of the roller, $\Delta r$ is the eccentricity of the mounting position from the roller center, and $\theta$ is the rotation angle of the roller.

If $\Delta r < < r$, then $$l = r + \Delta r \cdot \cos\theta$$

More specifically, the distance l defines a sinusoidal wave having one revolution of the roller as one period, and if it is sampled by encoder pulses for equally dividing one period into 3,600 intervals, the sampling theorem can be sufficiently satisfied. Therefore, this variation is accurately recorded in the memory 19. If the rotational angular velocity of the motor 11 is represented by $\omega$, a peripheral velocity at the displacement detection position of the roller is given by:

$$v = \omega l = \omega(r + \Delta r \cdot \cos\theta)$$

The object of the present invention is to make the peripheral velocity of the roller at the displacement detection position, i.e., the traverse velocity v of the sheet constant. For this purpose, $\omega$ is set as follows:

$$\omega = v/(r + \Delta r \cdot \cos\theta)$$

The calculation unit 30 calculates a setting value based on the setting value $\omega$ in consideration of a delay time of an actually used control system, and stores the setting value calculated according to the roller diameter data in the memory 31.

A system for performing traverse control based on the content of the memory 31 will be described below. In FIG. 1, a counter 61 is arranged in addition to the counter 18. The counter 61 performs a count-up operation in response to the output from the encoder 13, and is cleared in response to the output from the photo interrupter 15. The memory 31 stores the setting value calculated as described above. A D/A converter 62 converts the output from the memory into an analog voltage value. A low-pass filter 63 smoothly reproduces an output from the D/A converter 62. The output from the low-pass filter 63 serves as a rotation speed setting value of the control system. A pulse-voltage converter 55 converts an output pulse signal from the encoder 13 into a voltage for feeding back the motor rotational speed. A DC amplifier 52 is used for amplifying an error. A motor driving circuit 53 drives the motor 11 by its output.

In this manner, the control system prepares data for rotation control with respect to a roller rotation angle from the reference position in advance, and rotates the roller on the basis of the setting value. Therefore, even if the roller suffers from a mounting error, a variation in peripheral velocity of the roller, i.e., a variation in traverse velocity can be eliminated. For example, assuming that a roller having a diameter of 10 mm has a mounting displacement of 0.01 mm and a film traverse velocity is 40 mm/sec, a wow/flutter caused by eccentricity can be suppressed to 0.1% or less by the present invention, while it is 0.4% in the prior art.

In this embodiment, if the driving motor 11 comprises an ultrasonic motor, a delay of a transfer function of the control system can be reduced, and controllability can be considerably improved.

Second Embodiment

The first embodiment has been made under the condition that the roller 12 has a sufficiently high degree of roundness. If the degree of roundness is low, precise control cannot be performed. A second embodiment of the present invention will be described below. In this embodiment, even if the section of a roller is not circular and the roller is eccentrically mounted, precise control can be performed. The traverse mechanism itself of this embodiment is the same as that shown in FIG. 1.

Figure 3:
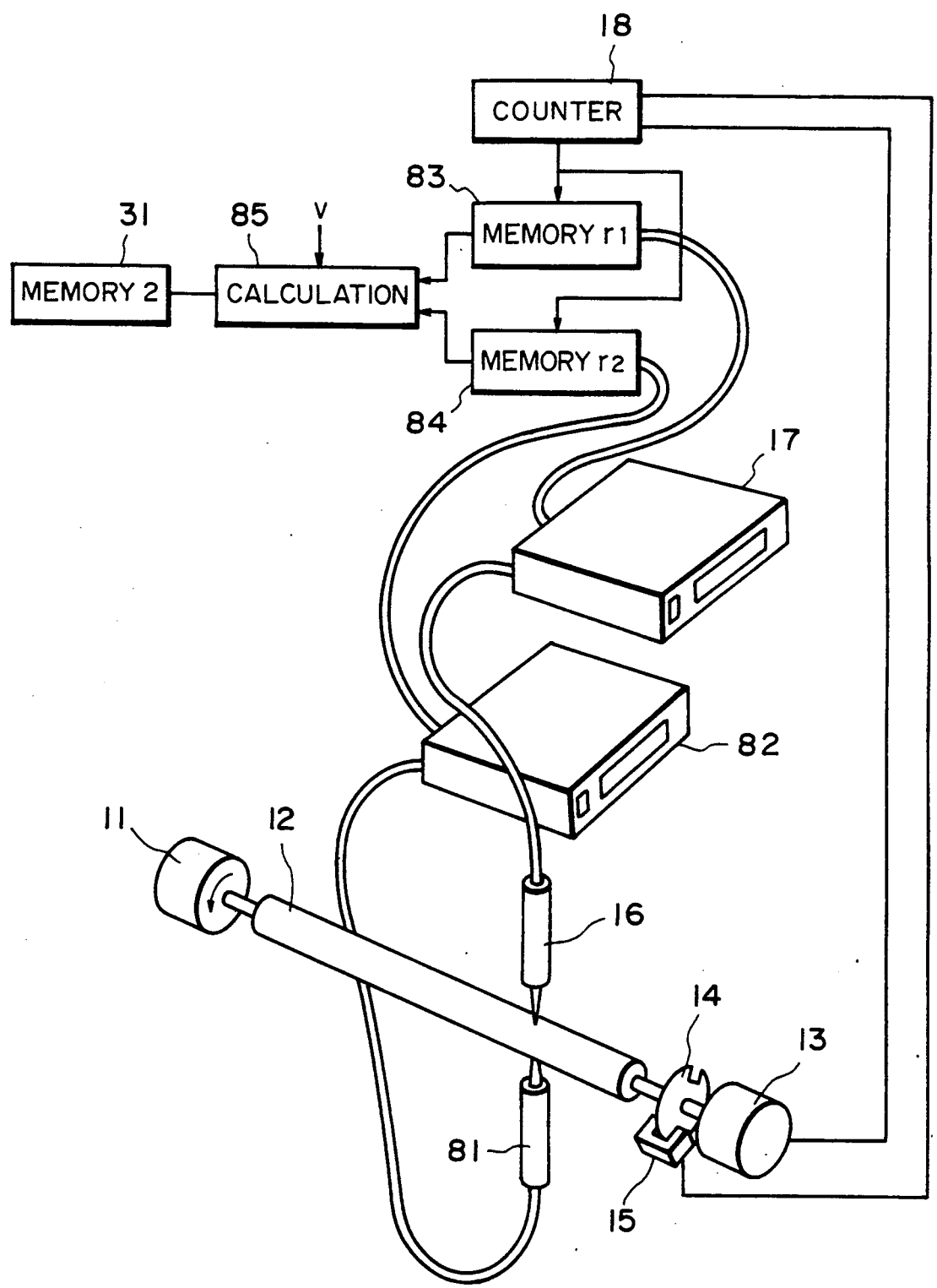
FIG. 3 is a schematic view of a second embodiment of the present invention.

FIG. 3 is a view for explaining a mechanism for measuring a variation in roller diameter, as in FIG. 2. The members 11 to 15 show a roller, its driving system, and a rotation detection system as in FIG. 2, and a detailed description thereof will be omitted. Relative position detectors 16 and 81 are brought into contact with the outer surface of the roller 12 to measure a degree of variation of the roller diameter, and have a precision of 1 $\mu$m. These relative position detectors 16 and 81 are arranged on a perpendicular passing through the rotation axis of the roller. Measurement points of the two detectors are adjusted on an arbitrary point on the perpendicular, and measurement values at that time are set to be 0. Detection units 17 and 82 respectively output detection values of the position detectors 16 and 81 as digital data. The outputs from the detection units 17 and 82 are respectively represented by $r_1$ and $r_2$. A counter 18 generates a memory address used when position detection data is stored in a memory. The counter 18 performs a count-up operation in response to the output pulse from an encoder 13, and is cleared in response to the output from a photo interrupter 15. Memories 83 and 84 respectively store the outputs $r_1$ and $r_2$ from the detection units 17 and 82 in correspondence with the rotation angle of the roller. A calculation unit 85 converts the contents of the memories 83 and 84 into data actually used for velocity control. A memory 31 stores the conversion result of the unit 85. Roller rotation control is performed using the content stored in the memory 31.

Figure 4:
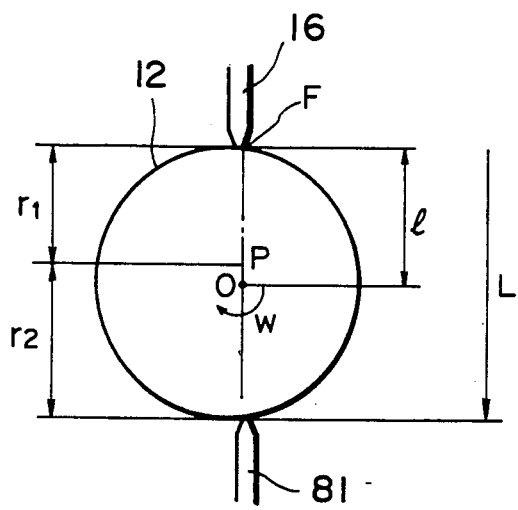
FIG. 4 is a sectional view of a driving roller.

A method of calculating a setting value $\omega$ to be stored in the memory 31 based on $r_1$ and $r_2$ in the calculation unit 85 will be described below. FIG. 4 is a sectional view when the roller 12 is viewed from its rotation axis direction. The position detectors are caused to coincide with each other at a point P on the perpendicular passing through a rotation center O of the roller, and their outputs are set to be 0. That is, $r_1$ and $r_2$ are distances from the point P and do not always represent the distances from the rotation center O. If the values of $r_1$ and $r_2$ at a given rotation angle $\theta$ are represented by $r_1(\theta)$ and $r_2(\theta)$, the same points are measured upside-down at a point after rotation by $\pi$(rad) from the angle $\theta$. Therefore, the following equation is established:

$$\text{ti } r_1(\theta)+r_2(\theta)=r_1(\theta+\pi)+r_2(\theta+\pi)=L(\theta) \quad (1)$$

Figure 5:
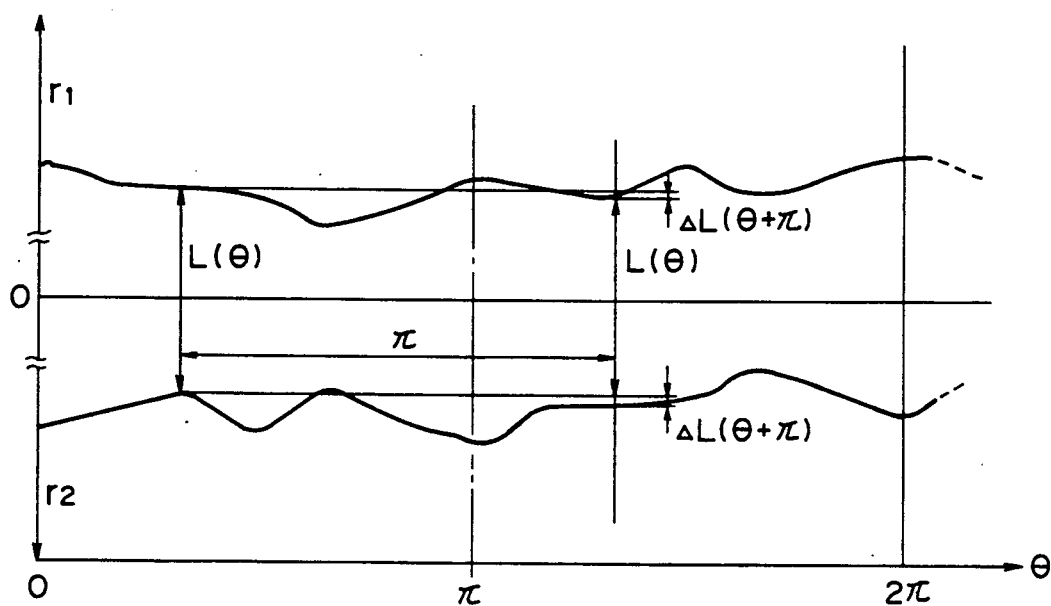
FIG. 5 is a graph showing a measurement result according to the second embodiment.

More specifically, changes in $r_1$ and $r_2$ as shown in FIG. 5 are measured. In FIG. 5, the rotation angle $\theta$ is plotted along the abscissa, and along the ordinate, $r_1$ is plotted upward and $r_2$ is plotted downward.

Equation (1) is modified as follows:

$$r_1(\theta)-r_1(\theta+\pi)=r_2(\theta+\pi)-r_2(\theta)=\Delta L(\theta) \quad (2)$$

$\Delta L(\theta)$ represents the eccentricity or the error with respect to a circle. When a distance l from the rotation center shown in FIG. 4 is obtained from equation (2), since a point F is an actual traverse point, the traverse velocity v can be calculated as $v=l\omega$ from the rotation angular velocity $\omega$.

After rotation by $\pi$(rad), a total displacement of $\Delta L$ is measured. Therefore, the distance $l(\theta)$ from the point F to the rotation center is calculated by the following equation:

$$\begin{aligned} l(\theta) &= (L(\theta) + \Delta L(\theta))/2 \\ &= (2r_1(\theta) + r_2(\theta) - r_1(\theta + \pi))/2 \end{aligned}$$

When $l(\theta)$ is calculated, the fact that if $\theta$ or $\theta+\pi$ exceeds one revolution $2\pi$, $r_1(\theta)=r_1(\theta+2\pi)$ is utilized.

Since $l(\theta)$ is obtained, $\omega$ for making the sheet traverse velocity constant is given by:

$$\begin{aligned} \omega(\theta) &= v/l(\theta) \\ &= 2v/(2r_1(\theta) + r_2(\theta) - r_1(\theta + \pi)) \end{aligned}$$

The memory 31 stores $\omega(\theta)$. The calculation unit 30 takes a delay time of an actually used control system into consideration in calculations, and stores a setting value which is advanced by a value corresponding to a delay time in the memory 31.

Constant velocity control can be performed by using the memory 31 for controlling the rotation of the roller shown in FIG. 1 as in the first embodiment.

In the first embodiment, a material to be traversed is traversed by driving the roller. However, the present invention can be applied to an apparatus using a traverse belt. In this case, a rotary driving member for driving the traverse belt can be controlled as in this embodiment.

In addition to the image recording apparatus, the present invention can be utilized in various fields such as an image reading apparatus, a surface checking apparatus, and the like, which are required to perform a precise traverse operation.

Third Embodiment

A third embodiment of the present invention will be described below with reference to FIG. 6. In this embodiment, the traverse mechanism itself is the same as that in FIG. 1.

In this embodiment, a recording sheet 23 on which a plurality of lines are drawn at equal time intervals in the main scanning direction (in a direction A in FIG. 6) at the same light intensity using the mechanism shown in FIG. 1 is prepared. The prepared recording sheet is read using a mechanism shown in FIG. 6 to perform calculations, thus obtaining data to be stored in the memory 31 shown in FIG. 1.

Figure 7:
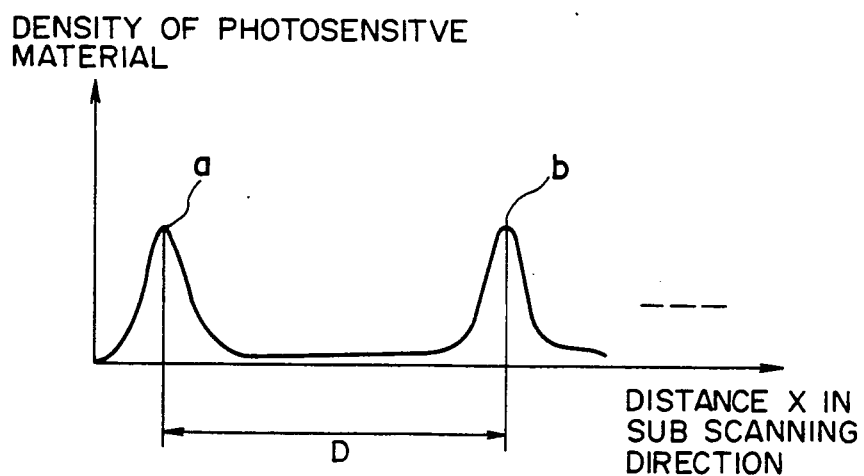
FIG. 7 is a graph for explaining a recording density of a recording sheet of the third embodiment.

Lines drawn on the recording sheet 23 correspond to one revolution of a roller 12 detected by a slit 14 and a photo interrupter 15. A rotational angular velocity of the roller 12 upon recording is a constant value $\omega_0$. For example, if the diameter of the roller 12 is 10 mm, a traverse velocity in the sub scanning direction is 40 mm/sec, and a sub scanning pitch is 0.08 mm, about 400 lines are drawn. FIG. 7 shows a change in recording density in the sub scanning direction of lines drawn on the recording sheet. Points a and b are light beam passage positions, and a distance D between the points a and b corresponds to the sub scanning pitch. The distance D should be constant, i.e., 0.08 mm. However, the value of the distance D changes among the scanning lines due to factors such as an eccentricity caused by a mounting error of a motor 11 to the roller 12 or a low degree of roundness of the roller 12 itself. Since a main scanning period $T_H$ of a light beam is always constant, a sub scanning traverse velocity $v_x$ of the recording sheet at that time is expressed by:

$$v_x = D/T_H$$

According to the above-mentioned example, $T_H$ for attaining a sub scanning traverse velocity of 40 mm/sec and a sub scanning pitch of 0.08 mm is $T_H = 0.08/40 = 2$ (m·sec), i.e., always a constant time interval.

The recording sheet recorded as described above is set on a reading section (FIG. 6) arranged to be separated from the traverse apparatus shown in FIG. 1, and intervals of the lines recorded on the recording sheet, i.e., the sub scanning pitches D are read. The apparatus shown in FIG. 6 includes the recording sheet 23 on which line data are recorded by the above-mentioned method, i.e., at constant time intervals, and a traverse table 41 for traversing the recording sheet. A light beam generator 43 is used for measuring a density of the recording sheet 23, and generates a light beam having a beam spot size equal to or smaller than that of the light beam with which lines are drawn on the recording sheet 23. A light intensity detector 44 measures an intensity of light generated from the light beam generator 43 and transmitted through the recording sheet 23. If the recording sheet 23 used is not of a transmission type but of a reflection type, the detector 44 is arranged at a position for measuring light reflected by the recording sheet 23. A slit 45 is formed on the traverse table 41, and allows a light beam to pass therethrough. A linear encoder which measures a traverse velocity position of the traverse table 41 in the submicron order by utilizing light interference has a slit 49 and a reading unit 50. The reading unit 50 outputs a pulse signal according to movement of the traverse table 41. The traverse table 41 is moved along a traverse path 51.

Figure 6:
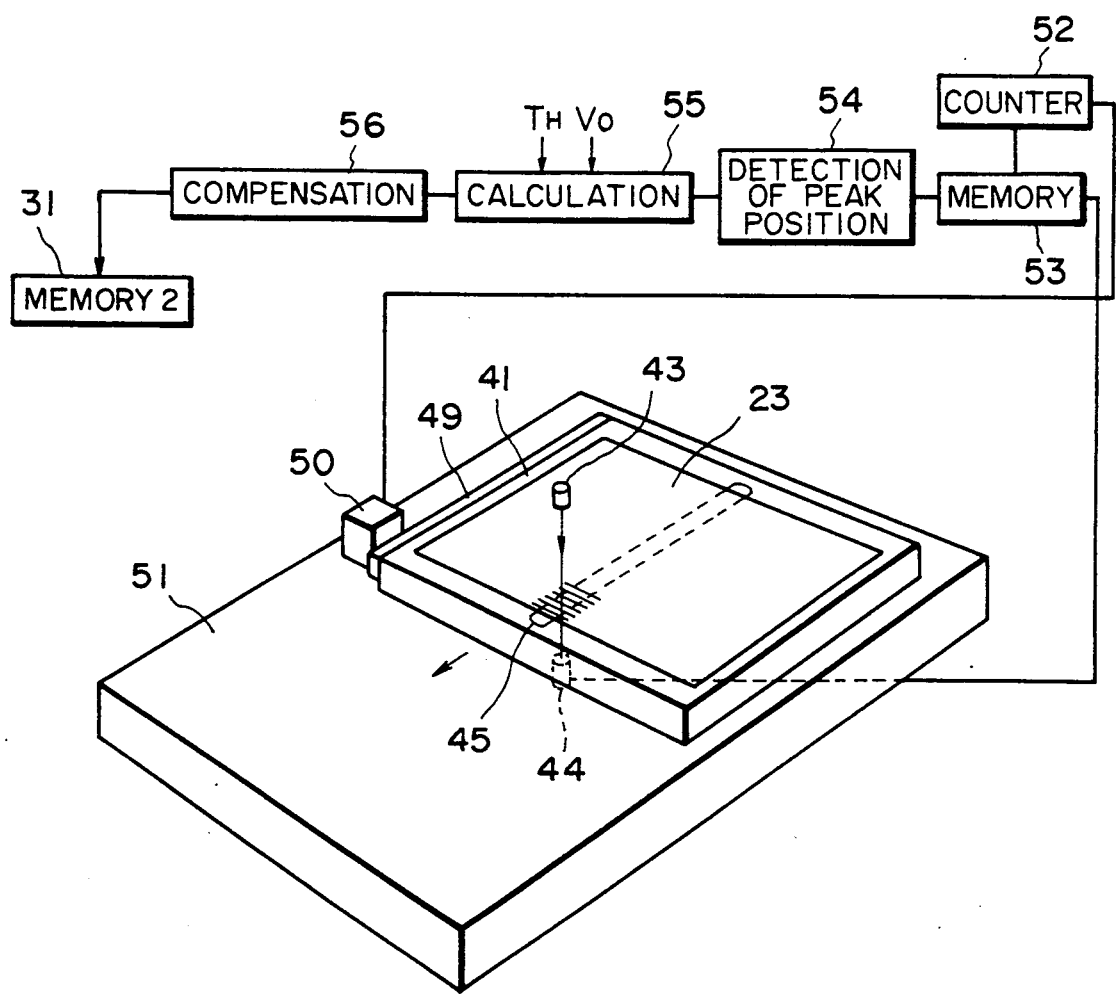
FIG. 6 is a schematic view showing an arrangement of a traverse velocity error read section according to a third embodiment of the present invention.

The block diagram illustrated in the upper portion of FIG. 6 shows an arrangement of the circuit for calculating traverse control data of the traverse apparatus shown in FIG. 1 on the basis of a density read from the recording sheet 23 by the detector 44. A counter 52 counts encoder pulses from the reading unit 50, and generates an address used for storing data in a memory 53. The memory 53 stores a density value output from the detector 44. A peak position detection unit 54 detects peak positions based on the density values stored in the memory 53, and calculates a distance between two adjacent peak positions. A calculation unit 55 calculates a traverse velocity v at that time using the distance D calculated by the peak position detection unit 54, and then calculates an angular velocity $\omega$ for making the traverse velocity to be a given constant value $v_0$. A compensation unit 56 compensates the angular velocity $\omega$ calculated by the calculation unit 55 in correspondence with the resolution of the rotary encoder 13. A memory 31 stores rotation control data used for traverse control.

In FIG. 6, the traverse table 41 on which the recording sheet 23 is set is moved at a constant speed, and outputs from the detector 44 are sequentially stored in the memory 53. Density data of portions on which lines are recorded are detected from the density data per revolution of the roller stored in the memory 53. The peak position detection unit 54 detects peak positions of the data, and sequentially outputs interpeak distances D. D(n) (n = 0, 1, 2, ..., N−1) sequentially obtained in this case have the following relationship with the rotation angle $\theta$.

If the rotational angular velocity of the roller 12 when recording was made on the recording sheet 23 is represented by $\theta_0$ and the main scanning period is represented by $T_H$, the rotation angle $\theta$ is given by:

$$\theta = n\,_0 T_H \, (n = 0, 1, 2, \ldots, N-1)$$

The above-mentioned D(n) can be expressed as a function of $\theta$ as follows:

$$D(\theta) = D(n\omega_0 T_H)$$

The calculation unit 55 calculates the traverse velocity $v(\theta)$ at that time based on $D(\theta)$ using the following equation:

$$\begin{aligned} v(\theta) &= v(n\omega_0 T_H) \\ &= D(\theta)/T_H \\ &= D(n\omega_0 T_H)/T_H \end{aligned} \quad (1)$$

The velocity $v(\theta)$ can also be expressed as follows using the distance $l(\theta)$ from the rotation center of the roller 12 at the angle $\theta$:

$$v(\theta) = \omega_0 l(\theta) \quad (2)$$

From equations (1) and (2), the following equation can be obtained:

$$\begin{aligned} l(\theta) &= l(n\omega_0 T_H) \\ &= v(\theta)/\omega_0 \\ &= D(n\omega_0 T_H)/T_H \omega_0 \end{aligned}$$

That is, since the distance $l(\theta)$ from the rotation center is obtained, the angular velocity $\omega(\theta)$ for making the traverse velocity $v_0$ to be a constant value is expressed by:

$$\begin{aligned} \omega(\theta) &= \omega(n\omega_0 T_H) \\ &= v_0/l(\theta) \\ &= v_0 T_H \omega_0 / D(n\omega_0 T_H) \end{aligned}$$

The calculation unit 55 calculates $\omega(n\omega_0 T_H)$. This value is obtained by sampling $\omega(\theta)$ at intervals of $\omega_0 T_H$. If the number of divisions of the rotary encoder 13 used for velocity control of the traverse apparatus is represented by M, a value obtained by sampling $\omega(\theta)$ at intervals of $2\pi m/M$ (m = 0, 1, 2, ..., M−1) should be used, and the compensation unit 56 compensates for the above-mentioned $\omega(n\omega_0 T_H)$ to obtain $\omega(2\pi m/M)$.

$\omega(2\pi m/M)$ obtained as described above is stored in the memory 31 in consideration of a delay time of the control system, and is used as a value for setting an angular velocity shown in FIG. 1 to perform image recording. Thus, the recording sheet 23 can be subjected to high-precision sub scanning without being influenced by the mounting eccentricity of the traverse roller 12, and a variation of the shape of the roller, and image precision can be improved.

The reading section shown in FIG. 6 can be assembled in the image recording apparatus together with the traverse apparatus, or may be used for adjustment as an apparatus separate from the image recording apparatus.

Fourth Embodiment

A fourth embodiment of the present invention will be described below.

In the above embodiments, when lines used for measuring a variation in velocity are drawn, they are drawn at equal time intervals regardless of the output pulses from the rotary encoder 13 shown in FIG. 1. Thus, when data for rotational angular velocity control performed in synchronism with the pulses is to be obtained, motor control data obtained by reading the drawn lines must be subjected to some compensation processing in correspondence with the encoder pulse positions. In general, if the section of a traverse roller is a circle having a radius r and the roller is mounted to have an error of $\Delta r$ from the center of the circle, a distance l from the rotation center to a traverse position is expressed by:

$$\Delta(\theta) \approx r + \Delta r \cdot \cos\theta$$

where $\theta$ is the rotation angle. This value has a period corresponding to one revolution of the roller 12, and in order to reproduce $l(\theta)$, several tens of points on the roller need only be sampled. That is, a rotary encoder with a smaller number of divisions can be used to simplify the control system.

Figure 8:
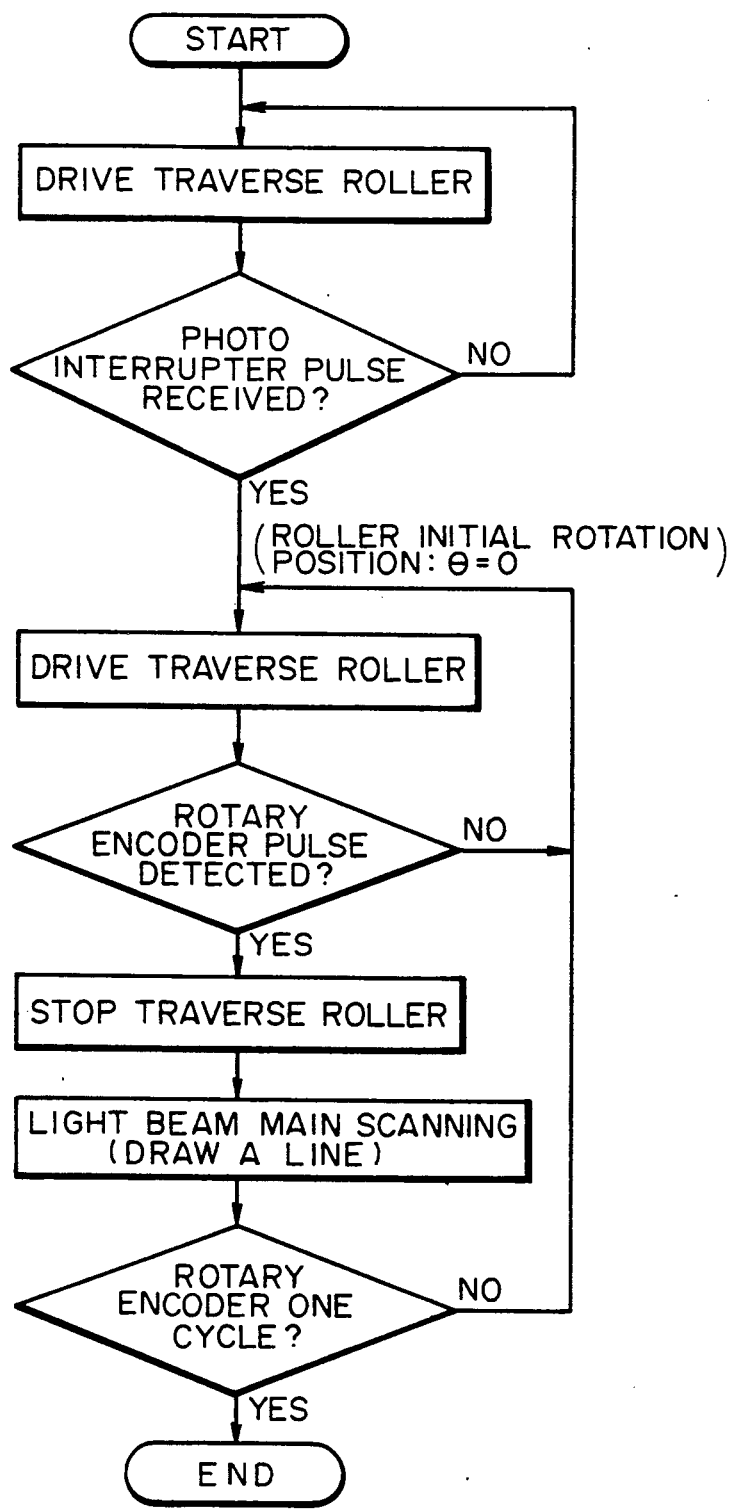
FIG. 8 is a flow chart showing an operation sequence of the third embodiment.

In this embodiment, for example, a 256-step rotary encoder is used in an apparatus as shown in FIG. 1. A traverse operation is temporarily stopped when the encoder pulse is generated. A light beam scans in the direction A in FIG. 1 to draw a line, and thereafter, the roller is driven. Such an operation is repeated to draw lines used for measuring a traverse velocity on the recording sheet 23. FIG. 8 shows this operation sequence as the flow chart.

The recorded recording sheet obtained by the above operation is read by the reading apparatus shown in FIG. 6 by the method described in the above embodiment. Velocity control data directly corresponds to rotary encoder pulse positions, and the compensation unit 56 shown in FIG. 6 can be omitted. The recording sheet can be traversed at a constant velocity by the traverse mechanism shown in FIG. 1 using this $\omega(\theta)$.

What is claimed is:
1. A traverse apparatus comprising:
   a rotary member for pinching and traversing a material to be traversed;
   storage means for prestoring rotation speed control data based on diameter data throughout one rotation of the rotary member corresponding to a rotation angle of said rotary member from a reference position in a circumferential direction thereof;
   detection means for detecting the rotation angle of said rotary member; and
   control means for controlling an angular velocity of said rotary member on the basis of an output from said detection means and content of said storage means so as to make a traverse velocity of the material to be traversed constant.
2. An apparatus according to claim 1, wherein the rotation angle is detected by an encoder arranged coaxially with a rotation axis of said rotary member.
3. An apparatus according to claim 1, wherein said rotary member is driven by an ultrasonic motor.
4. A traverse apparatus according to claim 1, wherein said diameter data throughout one rotation includes information or deviation of the diameter caused by unevenness or eccentricity of the rotary member.
5. A traverse apparatus according to claim 1 further comprising scanning means for scanning a light beam to the material to be traversed.
6. A traverse apparatus according to claim 5 further comprising recording means for recording onto the material to be traversed.
7. A traverse apparatus according to claim 6, wherein said material to be traversed is a recording sheet and said recording means comprises means for performing image recording onto the recording sheet by scanning the light beam.
8. A traverse method comprising the steps of:
   measuring diameter data throughout one rotation of a rotary member corresponding to a rotation angle of the rotary member, for pinching and traversing a material to be traversed, from a reference position in a circumferential direction of said rotary member while rotating said rotary member at a constant angular velocity;
   calculating and storing rotation speed control data on the basis of the diameter data;
   detecting the rotation angle of said rotary member during traversing of the material to be traversed; and
   controlling the rotation speed of said rotary member at the pinching portion on the basis of the detected rotation angle and the stored content so as to make a peripheral velocity of said rotary member constant.
9. A traverse method according to claim 8, wherein said diameter data throughout one rotation includes information on deviation of the diameter caused by unevenness or eccentricity of the rotary member.
10. A traverse apparatus comprising:
    a rotary member for pinching and traversing a material to be traversed;
    storage means for prestoring rotation speed control data throughout one rotation of said rotary member based on diameter data corresponding to a rotation angle of said rotary member;
    detection means for detecting the rotation angle of said rotary member; and
    control means for controlling an angular velocity of said rotary member based on an output from said detection means and a content of said storage means so as to make a traverse velocity of the material to be traversed constant.
11. A traverse apparatus according to claim 10 wherein said diameter data throughout one rotation includes information of deviation of the diameter caused by unevenness or eccentricity of the rotary member.
12. A traverse apparatus according to claim 10 further comprising scanning means for scanning a light beam to the material to be traversed.
13. A traverse apparatus according to claim 12 further comprising recording means for performing recording onto the material to be traversed.
14. A traverse apparatus according to claim 13, wherein said material to be traversed is a recording sheet and said recording means comprises means for performing image recording onto the recording sheet by scanning the light beam.

* * * * *

UNITED STATES PATENT AND TRADEMARK OFFICE
CERTIFICATE OF CORRECTION

PATENT NO. : 5,055,756
DATED : October 8, 1991
INVENTOR(S) : Keiji Ohkoda et al.

It is certified that error appears in the above-identified patent and that said Letters Patent is hereby corrected as shown below:

COLUMN 1:
　　　Line 65, "measured That" should read -- measured. That --.

COLUMN 4:
　　　Line 3, "equation" should read -- equation: --.

COLUMN 5:
　　　Line 60, "ti" should be deleted.

UNITED STATES PATENT AND TRADEMARK OFFICE
CERTIFICATE OF CORRECTION

PATENT NO. : 5,055,756

DATED : October 8, 1991

INVENTOR(S) : Keiji Ohkoda et al.

It is certified that error appears in the above-identified patent and that said Letters Patent is hereby corrected as shown below:

COLUMN 8:

Line 10, "$\theta_0$" should read --$\omega_0^2$--.

COLUMN 10:

Line 5, "or" should read -- on --; and

Line 54, "of" (first occurrence) should read --on--.

Signed and Sealed this

Sixteenth Day of March, 1993

Attest:

STEPHEN G. KUNIN

*Attesting Officer*     *Acting Commissioner of Patents and Trademarks*